US008682277B2

(12) United States Patent
Luke et al.

(10) Patent No.: US 8,682,277 B2
(45) Date of Patent: *Mar. 25, 2014

(54) CONTROLLING METHOD AND SYSTEM FOR HANDHELD COMMUNICATION DEVICE AND RECORDING MEDIUM USING THE SAME

(75) Inventors: Hok-Sum Horace Luke, Taoyuan County (TW); Chih-Hua Wang, Taoyuan County (TW); Ying-Huang Wu, Taoyuan County (TW); Yi-Lin Chen, Taoyuan County (TW); Hsiang-Yuan Peng, Taoyuan County (TW); Yuan-Mao Tsui, Taoyuan County (TW); Cheng-Hao Chin, Taoyuan County (TW)

(73) Assignee: HTC Corporation, Taoyuan County (TW)

( * ) Notice: Subject to any disclaimer, the term of this patent is extended or adjusted under 35 U.S.C. 154(b) by 0 days.

This patent is subject to a terminal disclaimer.

(21) Appl. No.: 13/541,643

(22) Filed: Jul. 3, 2012

(65) Prior Publication Data

US 2012/0270609 A1    Oct. 25, 2012

Related U.S. Application Data

(63) Continuation of application No. 12/346,770, filed on Dec. 30, 2008, now Pat. No. 8,213,999, which is a continuation-in-part of application No. 12/146,455, filed on Jun. 26, 2008, now Pat. No. 8,117,471.

(30) Foreign Application Priority Data

Nov. 27, 2007 (TW) .............................. 96144990 A

(51) Int. Cl.
 *H04B 1/16* (2006.01)
 *H04B 1/38* (2006.01)
 *H04W 52/02* (2009.01)

(52) U.S. Cl.
 CPC ............. *H04B 1/1607* (2013.01); *H04W 52/02* (2013.01)
 USPC ..................... 455/343.1; 455/574; 455/343.2; 455/567

(58) Field of Classification Search
 USPC ............................ 455/574, 343.1, 343.2, 567
 See application file for complete search history.

(56) References Cited

U.S. PATENT DOCUMENTS

| 6,408,178 | B1 * | 6/2002 | Wickstrom et al. | 455/427 |
|---|---|---|---|---|
| 6,466,198 | B1 * | 10/2002 | Feinstein | 345/158 |
| 7,386,748 | B2 * | 6/2008 | Andou | 713/330 |
| 7,436,364 | B2 * | 10/2008 | Nishikido et al. | 343/702 |
| 8,117,471 | B2 * | 2/2012 | Chin | 713/320 |
| 8,213,999 | B2 * | 7/2012 | Luke et al. | 455/574 |

(Continued)

*Primary Examiner* — Duc M Nguyen
(74) *Attorney, Agent, or Firm* — Jianq Chyun IP Office

(57) ABSTRACT

A controlling method and a controlling system for a handheld communication device are provided. In the present method, a tilting state of the handheld communication device is detected by using a G-sensor when a notice is activated. Then, whether the tilting state is changed from a face up state to a face down state is determined. The handheld communication device is controlled to perform a function when the tilting state is confirmed to be changed from the face up state to the face down state. Accordingly, the handheld communication device may be controlled to perform a function timely according to the positioned state of the device without going through complicated procedures, so as to provide a more intuitive and convenient way to control the handheld communication device.

21 Claims, 10 Drawing Sheets

(56) References Cited

U.S. PATENT DOCUMENTS

2002/0021278 A1* 2/2002 Hinckley et al. ............... 345/156
2004/0127198 A1* 7/2004 Roskind et al. ............ 455/412.2
2004/0133817 A1* 7/2004 Choi ............................. 713/300
2004/0259536 A1* 12/2004 Keskar et al. ................. 455/418
2006/0240866 A1* 10/2006 Eilts ........................... 455/556.1
2007/0004451 A1* 1/2007 C. Anderson ............... 455/556.1
2010/0159998 A1* 6/2010 Luke et al. .................... 455/567

* cited by examiner (a)

(b)

(c)

(d)

(a)

(b)

CONTROLLING METHOD AND SYSTEM FOR HANDHELD COMMUNICATION DEVICE AND RECORDING MEDIUM USING THE SAME

CROSS-REFERENCE TO RELATED APPLICATION

This application is a continuation of U.S. application Ser. No. 12/346,770, filed on Dec. 30, 2008. The prior application Ser. No. 12/346,770 is a continuation-in-part of U.S. application Ser. No. 12/146,455, filed on Jun. 26, 2008. The prior application Ser. No. 12/146,455 claims the priority benefit of Taiwan application Serial No. 96144990, filed on Nov. 27, 2007. The entirety of each of the above-mentioned patent applications is hereby incorporated by reference herein and made a part of this specification.

BACKGROUND OF THE APPLICATION

1. Field of the Application

The present application relates to a controlling method and a controlling system, and in particular, to a controlling method and a controlling system for a handheld communication device using a G-sensor.

2. Description of Related Art

Along with the continuous development of the technology, handheld communication devices such as a mobile phone, or a personal digital assistant (PDA) phone have integrated a greater number of functions. Besides functions such as making calls, sending/receiving messages, and making notes, surfing the Internet and receiving/sending e-mails also have become basic functions of the handheld communication devices in the current market. Multiple functions not only can facilitate people's life but also can provide entertainments, and thus the handheld communication devices have become one of the most popular high-tech electronic products in the current market.

A user is able to use the handheld communication device to receive and make calls. In a normal mode of the handheld communication device, when receiving an incoming call, the handheld communication usually reminds the user to pick up the phone through a ringing and/or a vibration fashion. However, it is happened that in situations of attending a meeting or a lecture, the handheld communication device usually bursts out ringing when receiving an incoming call and the user can only embarrassingly hand up the call or switch the handheld communication device into a mute mode, which is quite inconvenient.

SUMMARY OF THE APPLICATION

In light of the above, the present application provides a controlling method and a controlling system for a handheld communication device, in which a G-sensor is used for detecting a tilting state of the handheld communication device, so as to determine whether to perform a function of the handheld communication device when a notice is activated.

In order to achieve the above-mentioned or other objects, the present application provides a controlling method for a handheld communication device. First, a tilting state of the handheld communication device is detected by using a G-sensor. Then, whether the tilting state is changed from a face up state to a face down state is determined. The handheld communication device is controlled to perform a function when the tilting state is confirmed to be changed from the face up state to the face down state.

According to an embodiment of the present application, the step of detecting the tilting state of the handheld communication device comprises detecting the tilting state of the handheld communication device when a notice is activated.

According to an embodiment of the present application, the step of controlling the handheld communication device to perform the function comprises controlling the handheld communication device to enter a mute mode when the tilting state is confirmed to be changed from the face up state to the face down state.

According to an embodiment of the present application, the handheld communication device is controlled to enter the mute mode during the time period of the notice and is controlled to return to a normal mode when the notice mode is terminated.

According to an embodiment of the present application, the notice comprises a sound notice, wherein a sound of the handheld communication device is turned on in the normal mode and turned off in the mute mode.

According to an embodiment of the present application, the notice comprises a sound notice, wherein a sound of the handheld communication device is turned on in the normal mode and turned off in the mute mode.

According to an embodiment of the present application, the notice comprises a ringtone notice, wherein a ringtone of the handheld communication device is turned on in the normal mode and turned off in the mute mode.

According to an embodiment of the present application, the notice comprises a vibration notice, wherein a vibration function of the handheld communication device is turned on in the normal mode and is turned off in the mute mode.

According to an embodiment of the present application, the step of detecting the tilting state of the handheld communication device comprises detecting the tilting state of the handheld communication device at a fixed interval, in which a length of the fixed interval is between 50 and 200 milliseconds.

According to an embodiment of the present application, the step of determining whether the tilting state is changed from the face up state to the face down state comprises following steps. First, whether the tilting state is in the face up state is determined. Next, it is continued to determine whether the tilting state is changed to the face down state when the tilting state is determined in the face up state. Then, whether a number of times that the tilting state is continuously determined in the face down state exceeds a preset value is determined when the tilting state is determined to be changed to the face down state. Finally, it is confirmed that the tilting state is changed from the face up state to the face down state when the number of times exceeds the preset value.

According to an embodiment of the present application, in the step of determining whether the number of times that the tilting state is continuously determined in the face down state exceeds a preset value, if the number of times has not exceeded the preset value and the tilting state is changed from the face down state to the tilting state other than the face down state, whether the tilting state is changed from the face up state to the face down state is re-determined.

According to an embodiment of the present application, in the step of detecting the tilting state of the handheld communication device by using the G-sensor, a normal vector of a plane of the handheld communication device is detected first. Then, a tiling angle that the plane is rotated along a transverse coordinate axis (X axis) and a rolling angle that the plane is rotated along a vertical coordinate axis (Y axis) are calculated according to the detected normal vector and compared with a plurality of angle ranges corresponding to a plurality of tilting states, so to determine the current tilting state of the handheld communication device.

According to an embodiment of the present application, the angle range of the tiling angle corresponding to the face up state is from 0 degree to 45 degree and from 315 degree to 360 degree and the angle range of the rolling angle corresponding to the face up state is from 0 degree to 45 degree and from 315 degree to 360 degree.

According to an embodiment of the present application, the angle range of the tiling angle corresponding to the face down state is from 170 degree to 190 degree and the angle range of the rolling angle corresponding to the face down state is from 170 degree to 190 degree.

According to an embodiment of the present application, the plane of the handheld communication device is the plane comprising a screen of the handheld communication device.

According to an embodiment of the present application, the tilting state comprises landscape left state, landscape right state, portrait top state, portrait bottom state, face up state, and face down state.

The present application provides a controlling system comprising a G-sensor and a tilting state determining module, in which the G-sensor is used for detecting a tilting state of a handheld communication device and the tilting state determining module is used for determining whether the tilting state is changed from a face up state to a face down state and controlling the handheld communication device to perform a function when the tilting state is confirmed to be changed from the face up state to the face down state.

According to an embodiment of the present application, the G-sensor detects the tilting state of the handheld communication device when a notice is activated, and the tilting state determining module controls the handheld communication device to enter a mute mode when the tilting state is confirmed to be changed from the face up state to the face down state.

According to an embodiment of the present application, the tilting state determining module controls the handheld communication device to enter the mute mode during the time period of the notice and return to a normal mode when the mute mode is terminated.

According to an embodiment of the present application, the G-sensor comprises detecting the tilting state of the handheld communication device at a fixed interval.

According to an embodiment of the present application, the tilting state determining module comprises determining whether the tilting state is in the face up state, continuing to determine whether the tilting state is changed to the face down state when the tilting state is determined in the face up state, determining whether a number of times that the tilting state is continuously determined in the face down state exceeds a preset value when the tilting state is determined to be changed to the face down state, and confirming that the tilting state is changed from the face up state to the face down state when the number of times exceeds the preset value.

According to an embodiment of the present application, the G-sensor comprises detecting a normal vector of a plane of the handheld communication device, calculating a tiling angle that the plane is rotated along a transverse coordinate axis (X axis) and a rolling angle that the plane is rotated along a vertical coordinate axis (Y axis) according to the detected normal vector, and comparing the tiling angle and the rolling angle with a plurality of angle ranges corresponding to a plurality of tilting states to determine the current tilting state of the handheld communication device, wherein the angle range of the tiling angle corresponding to the face up state is from 0 degree to 45 degree and from 315 degree to 360 degree and the angle range of the rolling angle corresponding to the face up state is from 0 degree to 45 degree and from 315 degree to 360 degree, and the angle range of the tiling angle corresponding to the face down state is from 170 degree to 190 degree and the angle range of the rolling angle corresponding to the face down state is from 170 degree to 190 degree.

The present application provides a recording medium, for recording a computer program, wherein the computer program comprises a plurality of program codes, and the computer program is suitable for being loaded into a handheld communication device to enable the handheld communication device to execute a controlling method, and the controlling method comprises following steps. First, a tilting state of the handheld communication device is detected. Then, whether the tilting state is changed from a face up state to a face down state is determined and the handheld communication device is controlled to perform a function when the tilting state is confirmed to be changed from the face up state to the face down state.

In the present application, a G-sensor is used to detect the tilting state of the handheld communication device, in which the tilting state comprises landscape left state, landscape right state, portrait top state, portrait bottom state, face up state, and face down state, and each of which has a corresponding angle range. If it is determined that the tilting state of the handheld communication is changed from the face up state to the face down state, the handheld communication device is controlled to perform a function without going through complicated operating procedures, and thereby a more intuitive and convenient way to control the handheld communication device is provided.

BRIEF DESCRIPTION OF THE DRAWINGS

The accompanying drawings are included to provide a further understanding of the application, and are incorporated in and constitute a part of this specification. The drawings illustrate embodiments of the application and, together with the description, serve to explain the principles of the application.

DESCRIPTION OF EMBODIMENTS

Usually, when an user operates a handheld communication device equipped with a screen, such as a vertical type (bar type) device or a glide-open type (sliding type) device, he/she often places the front plane (i.e. the plane having the screen) of the device upwards. If the device is a flip-open type (clam shall type) device, the user may also place an upper lid having the screen upwards or inclined upwardly when the device is in use. However, in some situations such as in a meeting or in a lecture, when receiving an incoming call, a user may be improper to pick it up and need to hand up the phone or mute the device instantly. At this very moment, a most intuitive way is to flip the device and let the front plane face toward the downward direction, such that the present application provides a controlling method and a controlling system for a handheld communication device and a recording medium using the same based on the above-mentioned concept. In order to make the present application more comprehensible, embodiments are described below as the examples to prove that the application can actually be realized.

Figure 1:
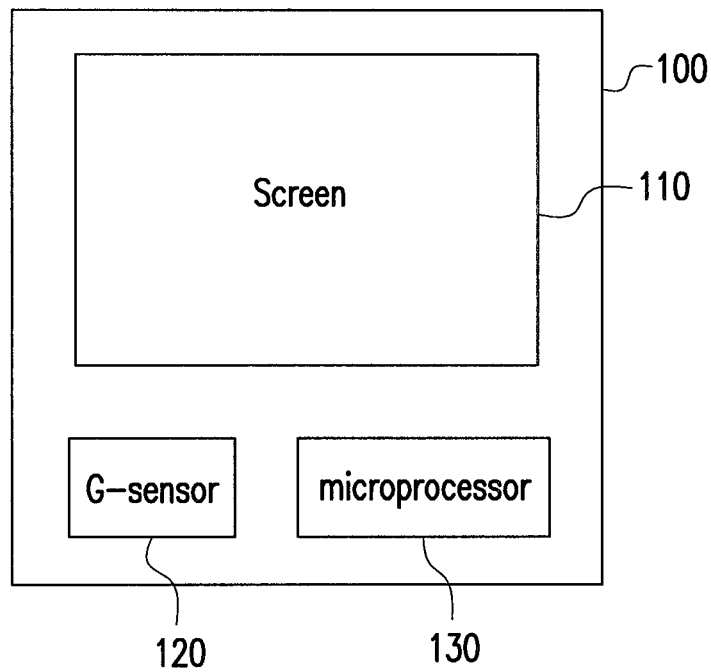
FIG. 1 is a block diagram of a handheld communication device according to one embodiment of the present application.

FIG. 1 is a block diagram of a handheld communication device according to one embodiment of the present application. Referring to FIG. 1, the handheld communication device 100 of the present application comprises a screen 110, a G-sensor 120, and a microprocessor 130. The handheld communication device 100 comprises, for example, a mobile phone, a smartphone, a touch phone, a PDA phone, or an ultra-mobile PC (UMPC), and the types of the handheld communication device 100 has no limitation.

According to the embodiment of the present application, the G-sensor 120 is disposed in the handheld communication device 100 for detecting a tilting state of the handheld communication device 100. To be specific, the G-sensor 120 is used to detect a normal vector of a plane of the handheld communication device 100 and calculate a tiling angle that the plane is rotated along a transverse coordinate axis (X axis) and a rolling angle that the plane is rotated along a vertical coordinate axis (Y axis) according to the detected normal vector. The aforesaid plane comprises, for example, the screen 110 of the handheld communication device 100 when the handheld communication device 100 is laid horizontally, or the plane comprises an upper lid having the screen of the handheld communication device 100 when a flip-open type handheld communication device 100 is in use.

The calculated tiling angle and rolling angle are then transmitted to microprocessor 130 for analyzing, so as to determine the current tilting state of the handheld communication device 100. In detail, the operating system 140 compares the calculated tiling angle and rolling angle with a plurality of angle ranges corresponding to a plurality of tilting states, so to determine whether the handheld communication device 100 should perform a function such as entering a mute mode.

Figure 2:
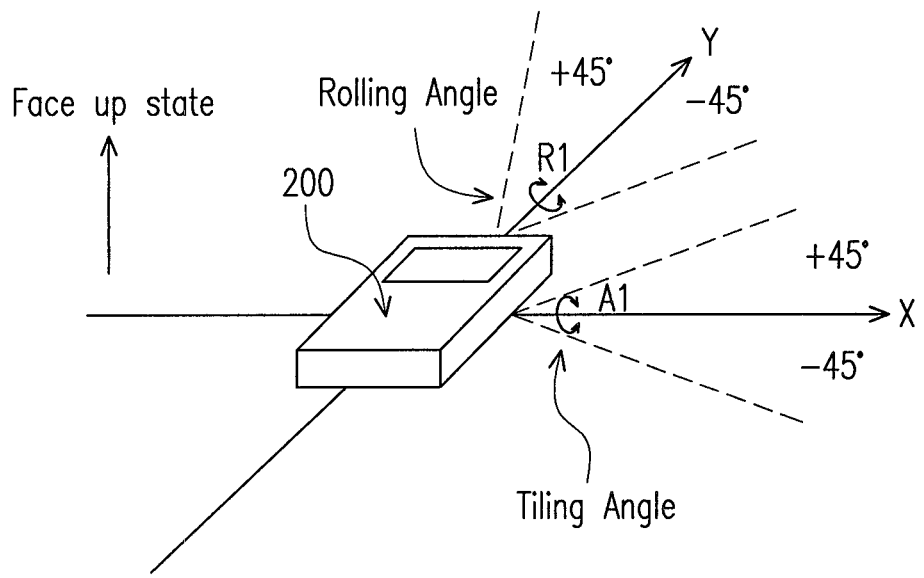
FIG. 2 is a schematic view illustrating a handheld communication device placed in a face up state according to one embodiment of the present application.

FIG. 2 is a schematic view illustrating a handheld communication device placed in a face up state according to one embodiment of the present application. Referring to FIG. 2, a front plane 200 of the handheld communication device is placed upwards, in which the front plane 200 is a plane having the screen. The tiling angle is defined as the angle A1 that the plane is rotated along a transverse coordinate axis (X axis) and the rolling angle is defined as the angle R1 that the plane is rotated along a vertical coordinate axis (Y axis). Moreover, the angle range of the tiling angle corresponding to the face up state is defined as from 0 degree to 45 degree and from 315 degree to 360 degree and the angle range of the rolling angle corresponding to the face up state is defined as from 0 degree to 45 degree and from 315 degree to 360 degree.

Figure 3:
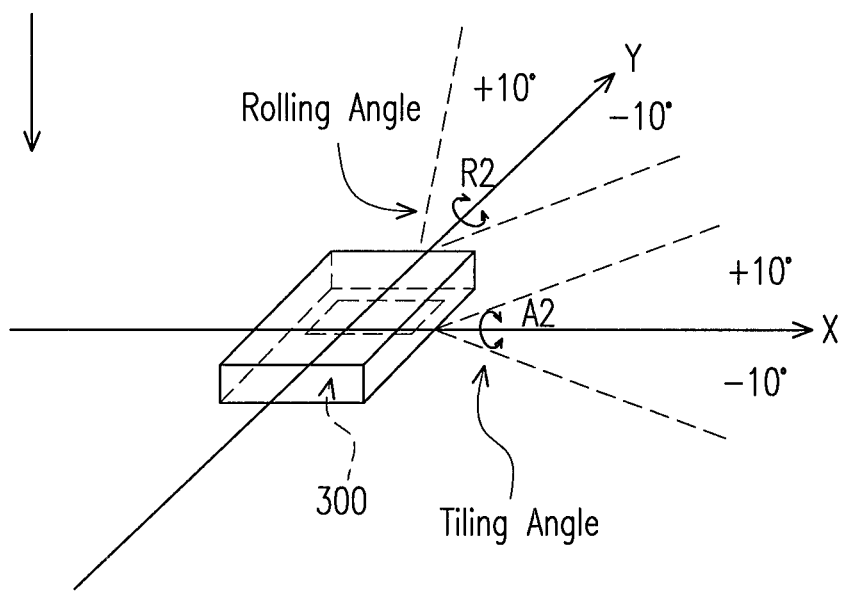
FIG. 3 is a schematic view illustrating a handheld communication device placed in a face down state according to one embodiment of the present application.

FIG. 3 is a schematic view illustrating a handheld communication device placed in a face down state according to one embodiment of the present application.

Referring to FIG. 3, a front plane 300 of the handheld communication device is placed downwards, in which the front plane 300 is a plane having the screen. The tiling angle is defined as the angle A2 that the plane is rotated along a transverse coordinate axis (X axis) and the rolling angle is defined as the angle R2 that the plane is rotated along a vertical coordinate axis (Y axis). Moreover, the angle range of the tiling angle corresponding to the face down state is from 170 degree to 190 degree and the angle range of the rolling angle corresponding to the face down state is from 170 degree to 190 degree.

Figure 4:
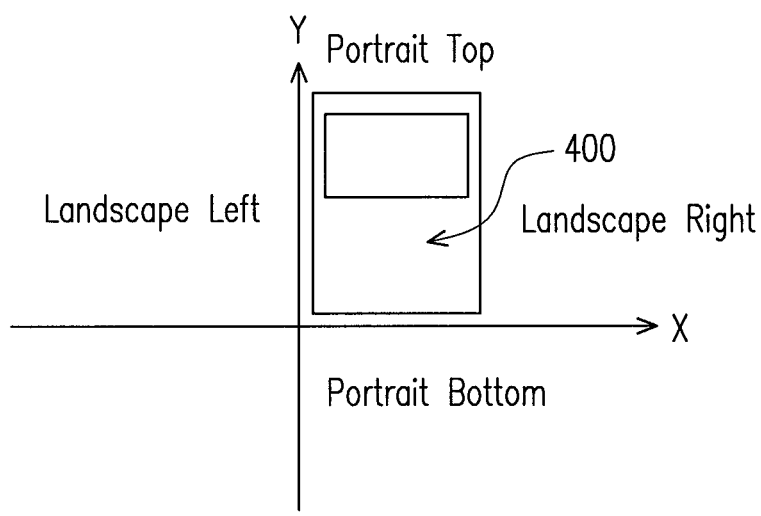
FIG. 4 is a schematic diagram illustrating the tilting states of a handheld communication device according to one embodiment of the present application.

It should be noted herein that besides the face up state and the face down state as defined above, the present application further classifies the tilting state of the handheld communication device 100 into a landscape left state, a landscape right state, a portrait top state, a portrait bottom state and also corresponds the rest angle ranges of the tiling angle and the rolling angle to those tilting states. FIG. 4 is a schematic diagram illustrating the tilting states of a handheld communication device according to one embodiment of the present application. Referring to FIG. 4, when the plane 400 of the handheld communication device is tilted to the left of the vertical axis (Y axis), then the tilting state of the handheld communication device is determined to be the landscape left state. When the plane 400 of the handheld communication device is tilted to the right of the vertical axis (Y axis), then the tilting state of the handheld communication device is determined to be the landscape right state. When the plane 400 of the handheld communication device is tilted to the top of the transverse axis (X axis), then the tilting state of the handheld communication device is determined to be the portrait top state. When the plane 400 of the handheld communication device is tilted to the bottom of the transverse axis (X axis), then the tilting state of the handheld communication device is determined to be the portrait bottom state.

Based on the above, when the operating system 140 determines that the tilting state of the handheld communication device 100 is changed from the face up state to the face down state, it then switches the handheld communication device 100 in to a mute mode, so as to prevent from interrupting or bothering the proceeding of a meeting or a lecture. Another embodiment is exemplified hereinafter to describe the detailed steps of the controlling method for the handheld communication device 100.

Figure 5:
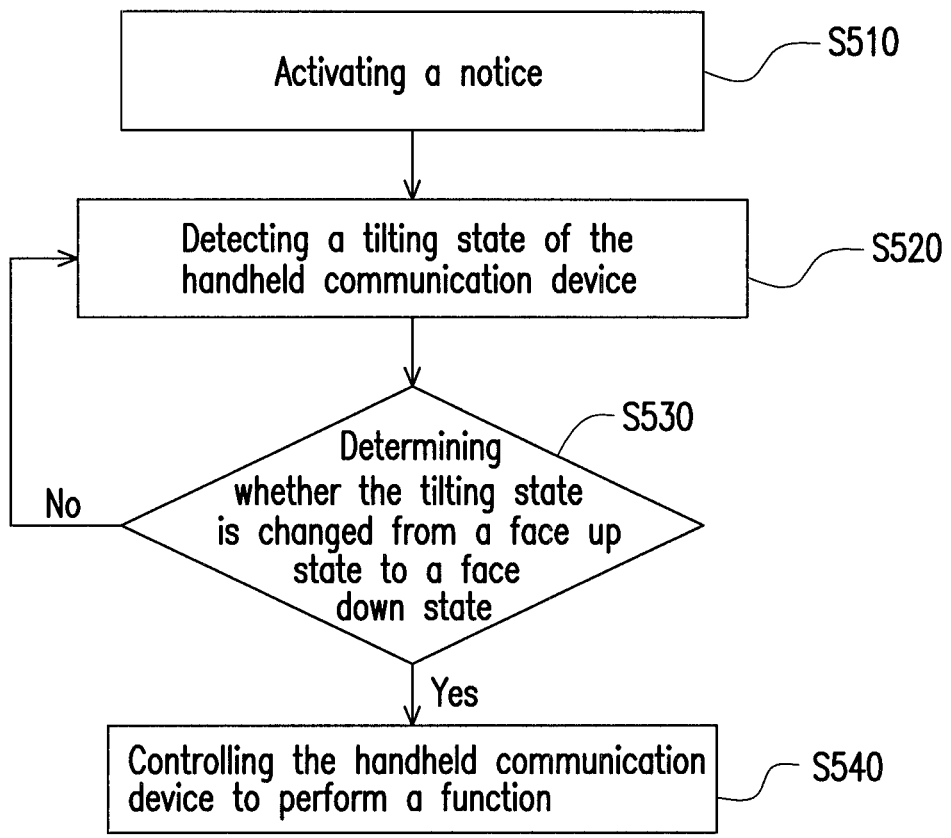
FIG. 5 is a flowchart illustrating a controlling method for a handheld communication device according to one embodiment of the present application.

FIG. 5 is a flowchart illustrating a controlling method for a handheld communication device according to one embodiment of the present application. Referring to FIG. 5, the present embodiment may be applied to the handheld communication device of the above-mentioned embodiments in order to control the handheld communication device to enter a mute mode timely when the front plane of the handheld communication device or the upper lid having the screen is determined as being directed from the upward to the downward direction. The steps of the present embodiment are as follows:

In a step S510, the handheld communication device activates a notice, for example, to remind the user of the alarm time or the appointment or event in the electronic calendar, or to inform the user of receiving an incoming call, a message, an e-mail and so on. According to the setting of a user, the notice may be a sound notice, a ringing notice and/or a vibration notice.

In a step S520, a G-sensor disposed in the handheld communication device is used for detecting the tilting state of the handheld communication device. In detail, the G-sensor can detect a normal vector of a plane of the handheld communication device and calculates a tiling angle and a rolling angle according to the detected normal vector, where the plane (as the plane 200 shown in FIG. 2) comprises the screen of the handheld communication device when the handheld communication device is laid horizontally. Then, according to the detected normal vector, the handheld communication device calculates a tiling angle that the plane is rotated along a transverse coordinate axis (X axis) and a rolling angle that the plane is rotated along a vertical coordinate axis (Y axis) according to the detected normal vector. Finally, the handheld communication device compares the calculated tiling angle and the rolling angle with a plurality of angle ranges corresponding to a plurality of tilting states so as to determine the current tilting state of the handheld communication device.

In a step S530, the handheld communication device determines whether the tilting state thereof is changed from a face up state to a face down state according to the calculated tiling angle and rolling angle. That is to say the calculated tiling angle and rolling angle is changed from within the angle range corresponding to the face up state to within the angle range corresponding to the face down state.

When the tilting state is confirmed to be changed from the face up state to the face down state, then in a step S540, the handheld communication device is controlled to perform a function such as entering a mute mode Otherwise, the handheld communication device continues to detect the tilting state of the handheld communication device and determine whether the tilting state is changed from the face up state to the face down state.

Based on the above, a user may switch the handheld communication device into the mute mode through simply flipping the handheld communication device, which is convenient and intuitive. Moreover, when the handheld communication device terminates the notice, it may keep staying in the mute mode so as to prevent from bothering, or the handheld communication device may automatically resume back to a normal mode so that the user may be notified by a sound notice, a ringtone notice, and/or a vibration notice when the handheld communication device activates a next notice. Certainly, the user may also switch the handheld communication device back to the normal mode by flipping the handheld communication device again to leave the face down state, by selecting a menu, or by any other means. It is noted that the notice comprises a sound notice, a ringtone notice, and a vibration notice, wherein the sound of the handheld communication device is turned on in the normal mode and turned off in the mute mode, the ringtone of the handheld communication device is turned on in the normal mode and turned off in the mute mode, and the vibration function of the handheld communication device is turned on in the normal mode and is turned off in the mute mode.

It should be emphasized herein that, in one embodiment, the handheld communication device may detect the tilting state of the handheld communication device at a fixed interval, which is between 50 and 200 milliseconds. If the detected tilting state is changed from the face up state to the face down state and continuously stays in the face down state for more than a period of time, then the number of times that the tilting state is in the face down state is accumulated and used to confirm that the tilting state is changed from the face up state to the face down state.

Figure 6:
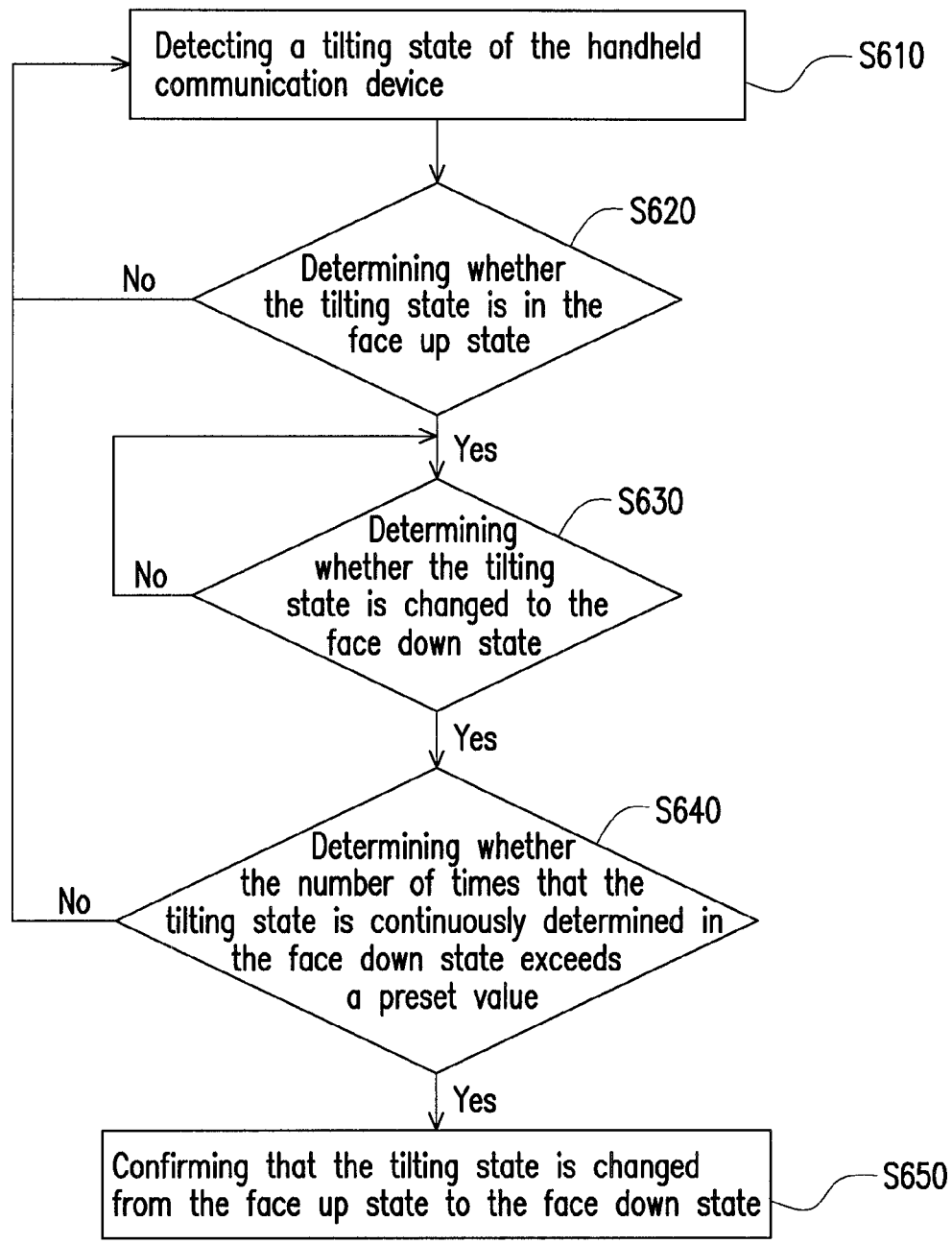
FIG. 6 is a flowchart illustrating a method for determining whether the tilting state of the handheld communication device is changed from the face up state to the face down state according to one embodiment of the present application.

FIG. 6 is a flowchart illustrating a method for determining whether the tilting state of the handheld communication device is changed from the face up state to the face down state according to one embodiment of the present application. Referring to FIG. 6, the handheld communication device determines the state transition between the face up state and the face down state according the order and the number of times that the handheld communication device stays in the face up state and the face down state. The steps of the present embodiment are as follows:

First, in a step S610, a G-sensor disposed in the handheld communication device is used for detecting the tilting state of the handheld communication device, in which a tiling angle and a rolling angle are calculated and compared with a plurality of angle ranges corresponding to a plurality of tilting states, so as to determine the current tilting state.

In a step S620, it is determined whether the tilting state is in the face up state. It can be determined that the tilting state is in the face up state if the calculated tiling angle and a rolling angle are within the angle ranges corresponding to the face up state, in which the angle range of the tiling angle corresponding to the face up state is from 0 degree to 45 degree and from 315 degree to 360 degree and the angle range of the rolling angle corresponding to the face up state is from 0 degree to 45 degree and from 315 degree to 360 degree.

If the tilting state of the handheld communication device is determine to be in the face up state, then, in a step S630, the handheld communication device continues to determine whether the tilting state is changed to the face down state. Similarly, the calculated tiling angle and a rolling angle are continuously compared with the angle ranes corresponding to all tilting states and it can be determined that the tilting state is changed to the face down state if the tiling angle and a rolling angle are determined to be within the angle ranges corresponding to the face down state, in which the angle range of the tiling angle corresponding to the face down state is from 170 degree to 190 degree and the angle range of the rolling angle corresponding to the face down state is from 170 degree to 190 degree.

It should be noted herein that, in the process of changing from the face up state to the face down state, the handheld communication device may pass through other tilting states, such as landscape left state, landscape right state, portrait top state, or portrait bottom state. However, the present embodiment does not limit the number or the type of tilting states that the handheld communication device has passed through. The key point is whether the handheld communication device stays in the face up state first and changed to the face down state in the end.

If the tilting state of the handheld communication device is determined to be changed to the face down state, then in a step S640, the handheld communication device determines whether a number of times that the tilting state is continuously determined in the face down state exceeds a preset value.

Whenever the number of times that the tilting state is continuously determined in the face down state exceeds the preset value, then, in a step S650, it is confirmed that the tilting state is changed from the face up state to the face down state. However, if the tilting state is changed from the face down state to the tilting state other than the face down state before the number of times exceeds the preset value, then the foregoing determined state transition is considered as a fake posture and whether the tilting state is changed from the face up state to the face down state has to be re-determined.

In detail, due to the unstability of the G-sensor, some deviations or noises may occur in the detecting result and the external forces like vibration of the device may increase those "errors". Therefore, in order to guarantee that the detected state transition, that is, from the face up state to the face down state, is a correct posture without being affected by the errors, in the situations that the tilting state is changed from the face down state to the face up state or other tilting state before the number of times in the face down state exceeds the preset value, the state transition will be considered as a fake posture, such that the determination process of the state transition has to be repeated again. Examples in respect of this issue are given below.

Figure 7:
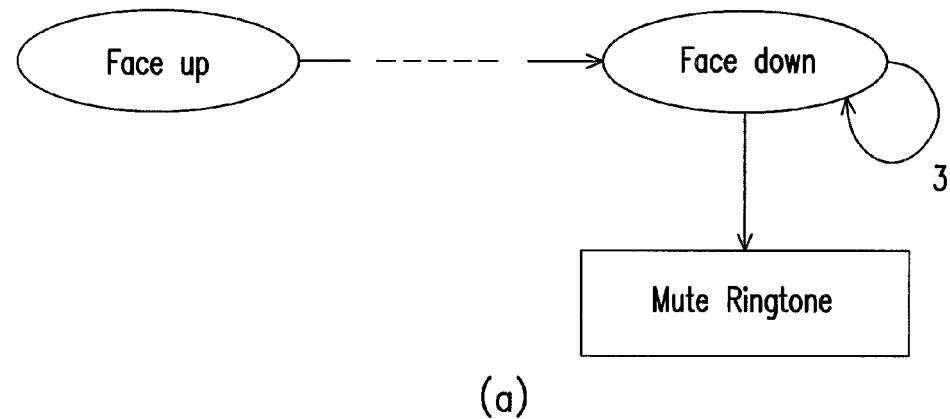
FIG. 7(a)~7(d) are schematic diagrams illustrating examples of determining whether the tilting state of the handheld communication device is changed from the face up state to the face down state according to one embodiment of the present application.
Figure 7:
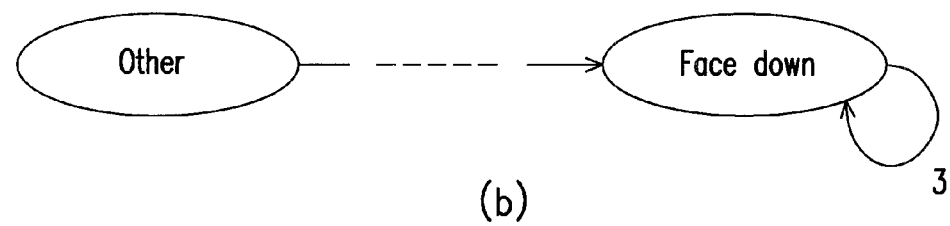
Figure 7:
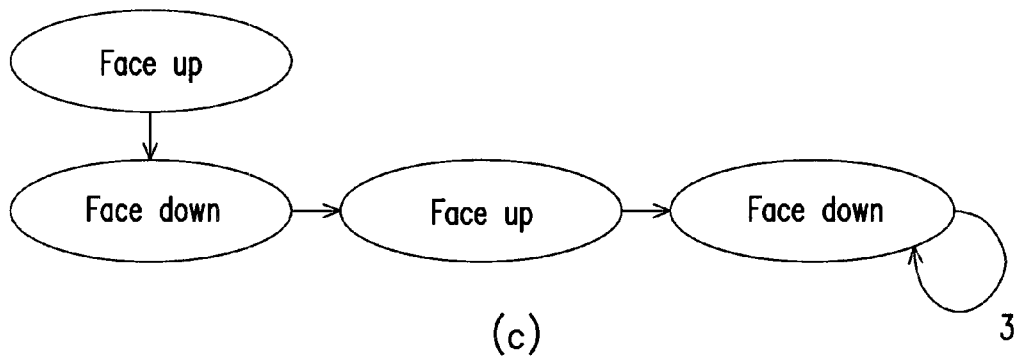
Figure 7:
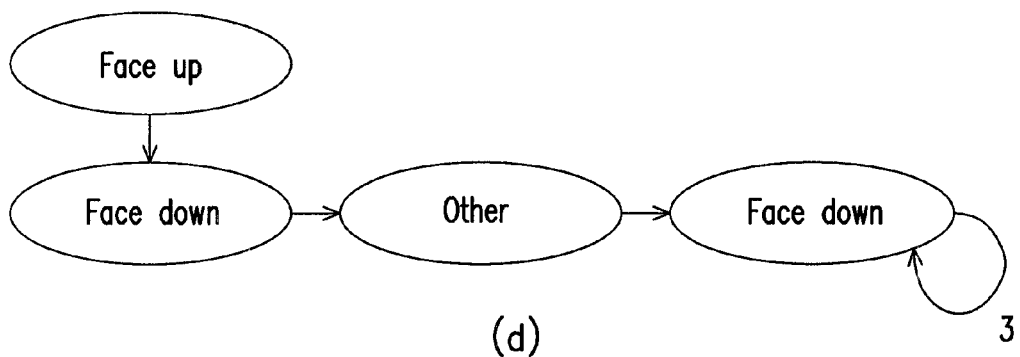

FIG. 7(a)~7(d) are schematic diagrams illustrating examples of determining whether the tilting state of the handheld communication device is changed from the face up state to the face down state according to one embodiment of the present application. Referring to FIG. 7(a), it indicates that if the tilting state starts from the face up state, ends at the face down state, and then stays in the face down state for more than three times (accumulated once at a 50-200 milliseconds interval), no matter how many titling states or what kinds of titling states that have been passed through, it always comes out with a correct posture, such that the handheld communication device is controlled to enter a mute mode, in which the ringtone of the handheld communication device is muted.

Referring to FIG. 7(b), it indicates that if the tilting state starts from a tilting state other than the face up state, ends at the face down state, and then stays in the face down state for more than three times, it results in a fake posture because the face up state is a requirement to trigger the controlling method of the present application.

Referring to FIG. 7(c), it indicates that if the tilting state starts from the face up state, passes through the face down state, face up state, and then returns to the face down state, it results in a correct posture because the face up state is occurred before the number of times staying in the face down state is accumulated to three times.

Similarly, referring to FIG. 7(d), it indicates that if the tilting state starts from the face up state, and passes through the face down state, the tilting state other than the face up state and face down state, and then returns to the face down state, it results in a fake posture because the another state is occurred before the number of times staying in the face down state is accumulated to three times.

Figure 8:
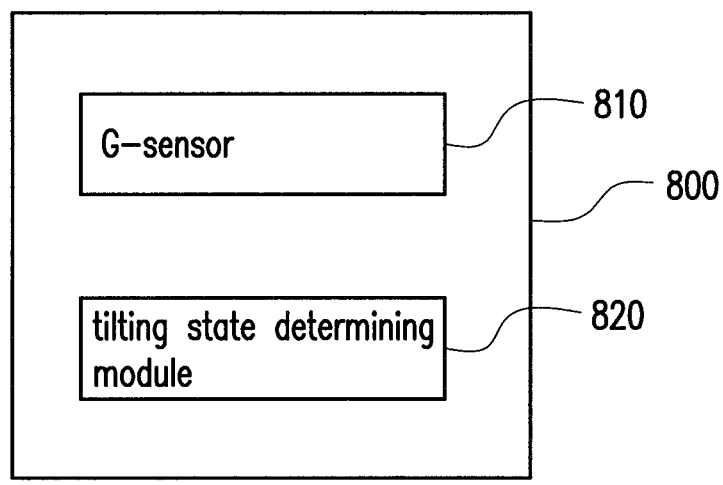
FIG. 8 is a block diagram illustrating a controlling system according to one embodiment of the present application.

The present application further provides a controlling system, which is installed in a handheld communication device so as to perform a function of the handheld communication device. FIG. 8 is a block diagram illustrating a controlling system according to one embodiment of the present application. Referring to FIG. 8, the controlling system 800 comprises a G-sensor 810 and a tilting state determining module 820. The G-sensor 810 is used for detecting a tilting state of a handheld communication device. The tilting state determining module 820 is used for determining whether the tilting state is changed from a face up state to a face down state. When the tilting state is confirmed to be changed from the face up state to the face down state, the tilting state determining module 820 controls the handheld communication device to perform a function such as entering a mute mode.

The G-sensor 810 detects a normal vector of a plane of the handheld communication device and calculates a tiling angle that the plane is rotated along a transverse coordinate axis (X axis) and a rolling angle that the plane is rotated along a vertical coordinate axis (Y axis) according to the detected normal vector. Then, the G-sensor 810 further compares the tiling angle and the rolling angle with a plurality of angle ranges corresponding to a plurality of tilting states to determine the current tilting state of the handheld communication device. The angle range of the tiling angle corresponding to the face up state is from 0 degree to 45 degree and from 315 degree to 360 degree and the angle range of the rolling angle corresponding to the face up state is from 0 degree to 45 degree and from 315 degree to 360 degree, and the angle range of the tiling angle corresponding to the face down state is from 170 degree to 190 degree and the angle range of the rolling angle corresponding to the face down state is from 170 degree to 190 degree.

It should be noted herein that the G-sensor 810 detects the tilting state of the handheld communication device at a fixed interval. Accordingly, the tilting state determining module 820 first determines whether the tilting state is in the face up state and continues to determine whether the tilting state is changed to the face down state when the tilting state is determined in the face up state. The tilting state determining module 820 also determines whether a number of times that the tilting state is continuously determined in the face down state exceeds a preset value when the tilting state is determined to be changed to the face down state. Finally, the tilting state determining module 820 confirms that the tilting state is changed from the face up state to the face down state when the number of times exceeds the preset value.

In addition to controlling the handheld communication device to enter a mute mode, in another embodiment, the present invention further provides a method for controlling the handheld communication device to enter a power saving mode. To be specific, when the user stop operating the device, and place it on a table or other objects, the user often places the front plane of the device upwards. When the user does not want others to see the content on the screen or does not want to use the device, the user can place the front plane of the device downward. Furthermore, if the device is a flip-open type (clam shall type) handheld electronic device, the user may also place an upper lid having the screen upwards or inclined upwardly when the device is in use. When the user does not want to use the device, he/she may place the upper lid having the screen downward or close it to prevent others from seeing the content on the screen.

Accordingly, when the front plane of the device or the upper lid having the screen is placed downward, it almost represents that the user wants to stop using the device. At this moment, if the device can be controlled to enter a power saving mode timely, unnecessary power waste can be reduced and a stand-by time of the handheld electronic device can be increased. Accordingly, the present application provides a controlling method and a controlling system for a handheld communication device based on the above-mentioned concept. In order to make the present invention more comprehensible, embodiments are described below as the examples to prove that the invention can actually be realized.

Figure 9:
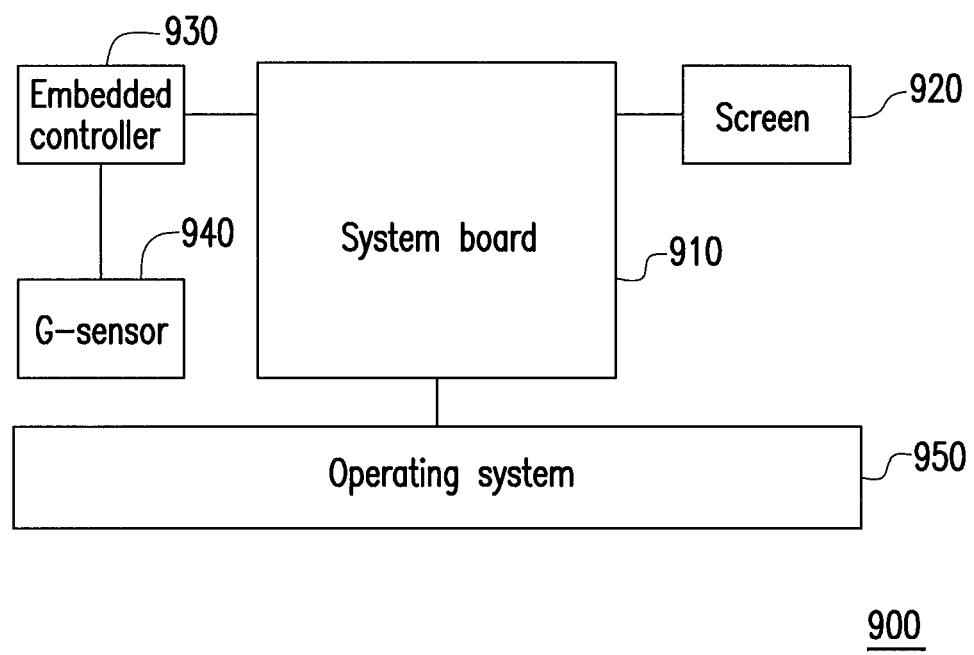
FIG. 9 is a block diagram of the handheld communication device according to one embodiment of the present invention.

FIG. 9 is a block diagram of the handheld communication device according to one embodiment of the present invention. Referring to FIG. 9, the handheld communication device 900 of the present invention includes a system board 910, a screen 920, an embedded controller 930, a G-sensor 940, and an operating system 950. The handheld communication device 900 includes, for example, a mobile phone, a smart phone, a touch phone, a PDA phone, or an ultra-mobile PC (UMPC), and the scope of types of the handheld communication device 100 has no limitation.

According to the embodiment of the present invention, the G-sensor 940 is disposed in the handheld communication device 900 for detecting a normal vector of a plane of the handheld communication device 900. The plane includes, for example, the screen of the handheld communication device when the handheld communication device is laid horizontally, or the plane includes an upper lid having the screen of the handheld communication device when a flip-open type handheld communication device is in use. FIG. 10(a) and FIG. 10(b) are schematic views illustrating the normal vector of the plane of the handheld communication device according to one embodiment of the present invention. Referring to FIG. 10(a), which illustrates the status when a front plane of the handheld communication device is placed upwards, a plane 1000 is a plane having the screen and the normal vector is vertical to the plane 1000 and has a component in a Z-axis direction. Referring to FIG. 10(b), which illustrates the status when the front plane of the handheld communication device is placed downward, the plane 1000 is a plane having the screen and the normal vector is vertical to the plane 1000 and has a component opposite to the Z-axis direction.

The detected value of the normal vector is transmitted to the operating system 950 through the embedded controller 930 and then is analyzed by the operating system 950, so as to determine whether the handheld communication device should enter the power saving mode. In detail, the handheld communication device is controlled to enter the power saving mode, and power saving functions such as switching off the screen 920, switching off the speaker (not shown in the figures), switching the handheld communication device 900 to silent mode, and muting the ring of an incoming call are carried out when the operating system 950 determines that the normal vector is directed toward the downward direction. Otherwise, the handheld communication device maintains the normal operating mode.

When the handheld communication device 900 enters the power saving mode, the embedded controller 930 takes charge of the control of the handheld communication device 900, and the G-sensor 940 continues to detect the normal vector of the plane of the handheld communication device 900. When the normal vector deviates from the downward direction, the embedded controller 930 controls the handheld communication device to resume the normal operating mode and returns the control of the handheld communication device back to the operating system 950, so that the users can operate the handheld communication device. Another embodiment is exemplified hereinafter to describe the detailed steps of the method of the handheld communication device 900.

Figure 11:
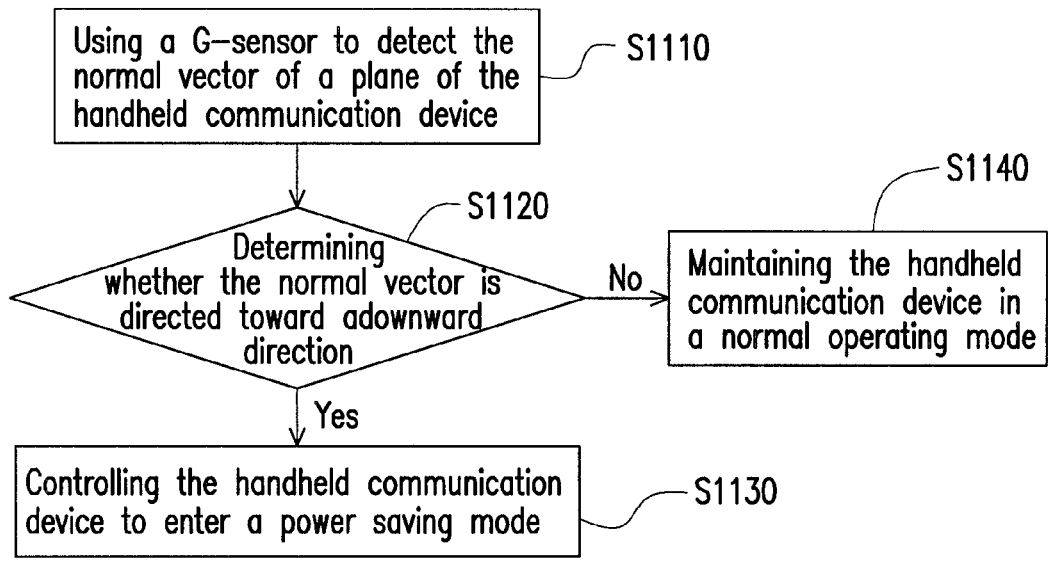
FIG. 11 is a flowchart illustrating the method for controlling the handheld communication device according to one embodiment of the present invention.

FIG. 11 is a flowchart illustrating the method for controlling the handheld communication device according to one embodiment of the present invention. Referring to FIG. 11, the present embodiment can be applied to the handheld communication device 900 of the above-mentioned embodiments in order to control the handheld communication device to enter to the power saving mode timely when the front plane of the handheld communication device or the upper lid having the screen is determined as being directed toward the downward direction. The steps of the present embodiment are as follows.

In a step S1110, a G-sensor is used for detecting the normal vector of a plane of the handheld communication device. The plane (as the plane 1000 shown in FIG. 10(a)) includes the screen of the handheld communication device when the handheld communication device is laid horizontally. The normal vector is then transmitted to the operating system through the embedded controller and the system board for performing the subsequent analyses and processes.

In a step S1120, whether the normal vector is directed toward a downward direction is determined by the operating system. In detail, the normal vector of the plane of the handheld communication device includes an x component, a y component, and a z component. When the handheld communication device is laid horizontally, the x component and the y component are 0. Accordingly, whether the normal vector is directed toward the downward direction or an upward direction can be determined according to the value of the z component. When the operating system determines that the value of the z component is negative, the normal vector can be determined as being directed toward the downward direction.

Accordingly, in a step S1130, the operating system further controls the handheld communication device to enter the power saving mode when the normal vector is determined as being directed toward the downward direction. On the contrary, the handheld communication device maintains the normal operating mode in a step S1140 when it is determined that the normal vector is not directed toward the downward direction. The above-mentioned power saving mode includes a sleep mode, a hibernate mode, a silent mode, or a mute mode. The power saving mode can be designed according to different demands of the users, and therefore the scope of the power saving mode is not limited by the present embodiment.

In light of the above, according to the value of the normal vector detected by the G-sensor, whether the handheld communication device or the upper lid having the screen is directed toward the downward direction can be determined easily, so that the handheld communication device can be controlled to enter to the power saving mode timely and power consumption can be reduced. It should be noted that the result of determining the direction of the normal vector of the handheld communication device can vary with different angles at which the handheld communication device is placed or can vary with variances in angle when the users carry the device around. The present invention provides solutions for the above-mentioned situations, and one embodiment is exemplified hereinafter for each of the above-mentioned solutions.

Figure 12:
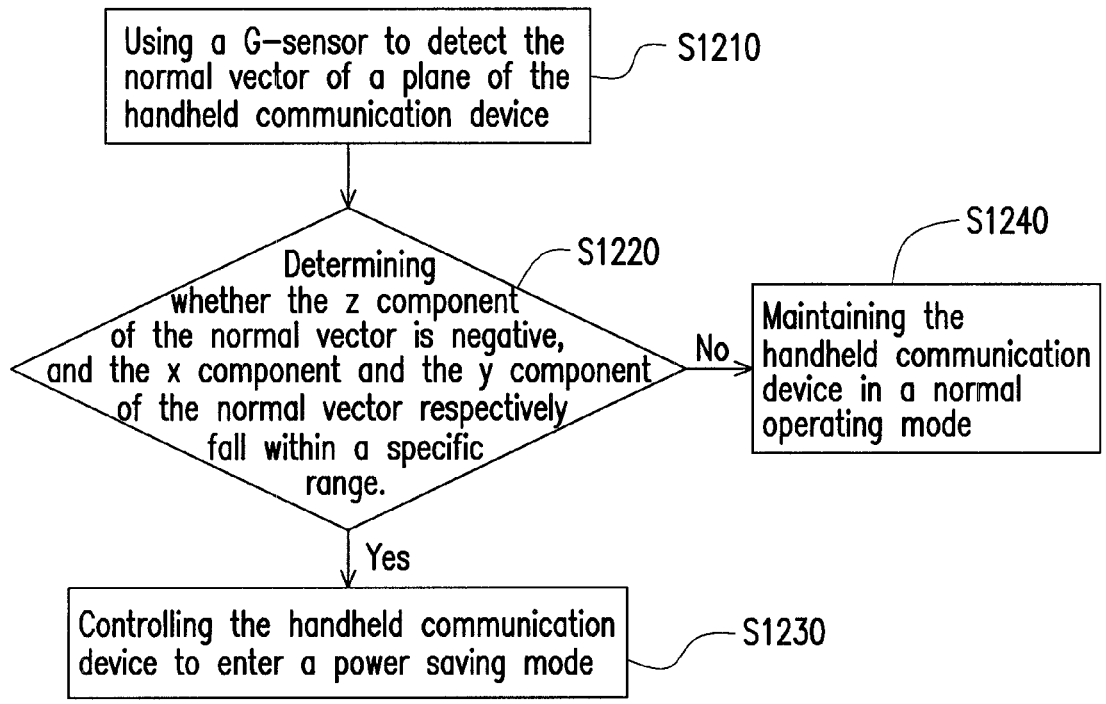
FIG. 12 is a flowchart illustrating the method for controlling the handheld communication device according to one embodiment of the present invention.

FIG. 12 is a flowchart illustrating the method for controlling the handheld communication device according to one embodiment of the present invention. Referring to FIG. 12, the present embodiment can be applied to the handheld communication device 900 of the above-mentioned embodiments in order to control the handheld communication device to enter the power saving mode timely when the front plane of the handheld communication device or the upper lid having the screen is determined as being directed toward the downward direction. The difference between the embodiment of FIG. 11 and the present embodiment is that the present embodiment provides a buffering range to allow the handheld communication device to achieve the same power saving effect when the normal vector of the front plane of the handheld communication device is not exactly directed toward the vertically downward direction. The steps of the present embodiment are as follows.

First, in a step S1210, a G-sensor is used for detecting the normal vector of a plane of the handheld communication device, wherein the plane includes the screen of the handheld communication device when the handheld communication device is laid horizontally. The normal vector is then transmitted to the operating system through the embedded controller and the system board for performing the subsequent analyses and processes.

Then, whether the normal vector is directed toward the downward direction is determined by the operating system. In detail, the normal vector of the handheld communication device includes an x component, a y component, and a z component. The normal vector is determined as being directed toward the downward direction when the x component, y component are 0 and when the z component is negative. However, because of the users' different habits of placing objects and different environments in which the objects are placed, the front plane of the device is not always exactly placed toward the vertically downward direction. Accordingly, the normal vector of the front plane may include the x component or the y component (i.e. the x component and the y component may not be 0). Therefore, in a step S1220, in addition to determining whether the z component of the normal vector is negative, whether the x component and the y component respectively fall within a specific range is determined.

In a step S1230, when the z component of the normal vector is negative, and the x component and y component fall within the specific range, the normal vector is determined as being directed toward the downward direction, and the operating system further controls the handheld communication device to enter the power saving mode. On the contrary, in a step S1240, when the z component of the normal vector is not negative, or the x component or the y component does not fall within the specific range, the handheld communication device maintains the normal operating mode.

Figure 10:
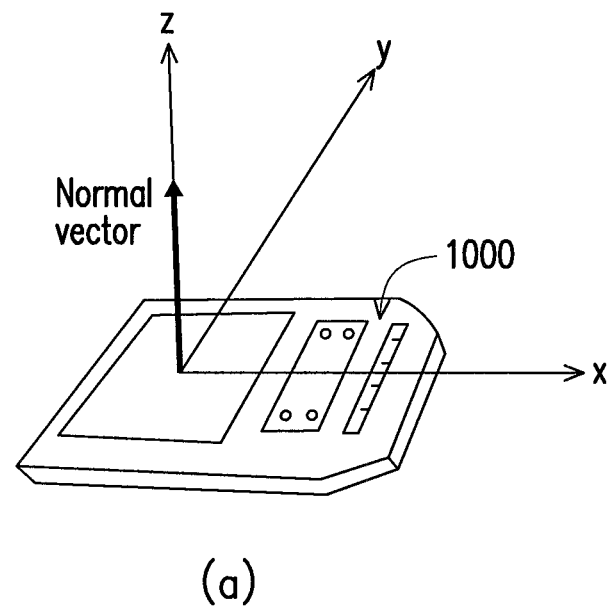
FIG. 10(a) and FIG. 10(b) are schematic views illustrating the normal vector of the plane of the handheld communication device according to one embodiment of the present invention.
Figure 10:
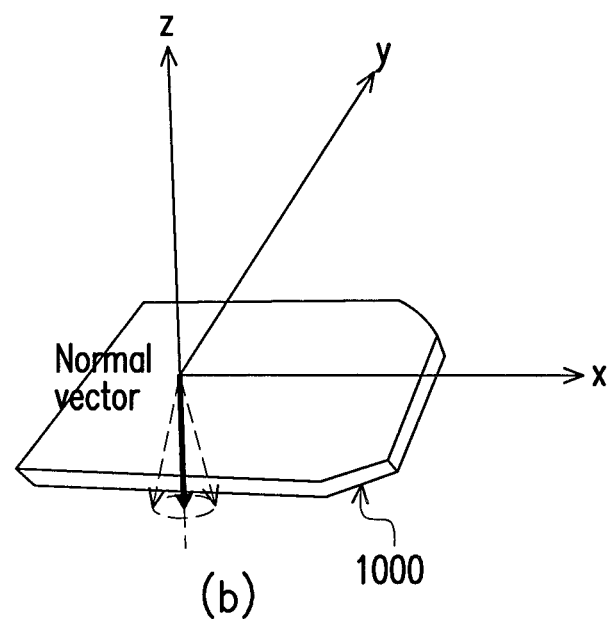

For example, referring to FIG. 10(*b*), a specific range indicated by dotted lines is provided for the normal vector. When the normal vector falls within the specific range, the normal vector is determined as being directed toward the downward direction, and thereby the handheld communication device is controlled to enter the power saving mode.

For example, when the flip-open type handheld communication device is in use, if the upper lid having the screen is slightly inclined to the downward direction, the flip-open type handheld communication device is not controlled to enter the power saving mode because the normal vector does not fall within the specific range.

By using the above-mentioned method, even when the front plane of the device slightly deviates from the vertically downward direction, it can be determined that the user wants to stop using the device. Therefore, the device is controlled to enter the power saving mode.

In addition, the present invention provides a buffering time to determine that the users really want the device to enter the power saving mode instead of placing the front plane of the device downward unknowingly. One embodiment is described in detail hereinafter.

Figure 13:
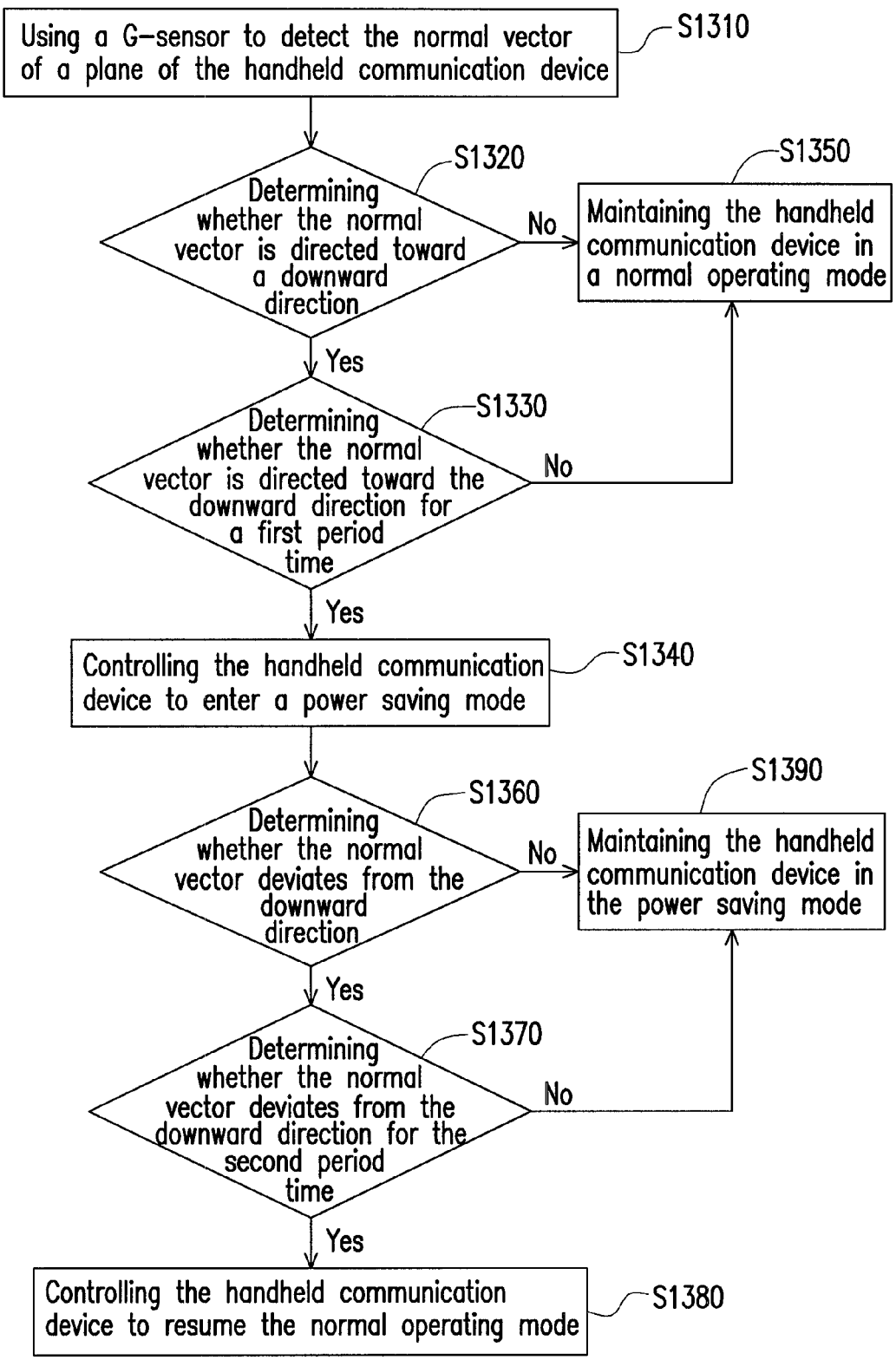
FIG. 13 is a flowchart illustrating the method for controlling the handheld communication device according to one embodiment of the present invention.

FIG. 13 is a flowchart illustrating the method for controlling the handheld communication device according to one embodiment of the present invention. Referring to FIG. 13, the present embodiment can be applied to the handheld communication device 900 of the above-mentioned embodiments in order to control the handheld communication device to enter to the power saving mode timely when the front plane of the handheld communication device is determined as being directed toward the downward direction. The difference between the present embodiment and the above-mentioned embodiments corresponding to FIGS. 11 and 12 is that the present embodiment provides a buffering time, so that only after it is determined that the front plane of the handheld communication device has been directed toward the downward direction for a period of time, the status that the users would like to switch off the device temporarily can be determined. Accordingly, the device is controlled to enter the power saving mode.

In a step S1310, a G-sensor is used for detecting the normal vector of a plane of the handheld communication device. The plane includes the screen of the handheld communication device when the handheld communication device is laid horizontally. The normal vector is then transmitted to the operating system through the embedded controller and the system board for performing the subsequent analyses and processes.

In a step S1320, whether the normal vector is directed toward the downward direction is determined by the operating system. The detailed step of determining whether the normal vector is directed toward the downward direction is the same as or similar to those of the above-mentioned embodiments, so is not repeated herein.

When the normal vector is determined as being directed toward the downward direction, whether the normal vector is directed toward the downward direction for a first time period is further determined in a step S1330. In a step S1340, when the normal vector is directed toward the downward direction and lasts for more than the first time period, the handheld communication device is controlled to enter the power saving mode. On the contrary, in a step S1350, when the normal vector deviates from the downward direction before the time period, the handheld communication device is not controlled to enter the power saving mode and the handheld communication device still maintains the normal operating mode.

It should be noted that the present embodiment further includes steps of switching on the device when the user wants to use the device again after the device enters the power saving mode. When the device enters the power saving mode, the embedded controller takes charge of the device. At this moment, the G-sensor of the device continues to detect the normal vector of the plane of the handheld communication device. In a step S1360, the value of the normal vector is transmitted to the embedded controller to determine whether the normal vector deviates from the downward direction. In a step S1370, the embedded controller further determines whether the normal vector deviates from the downward direction for more than the second time period. In a step S1380, when the normal vector deviates from the downward direction for more than the second time period, the embedded controller controls the handheld communication device to resume the normal operating mode. Furthermore, in a step S1390, the handheld communication device maintains the power saving mode if it is determined that the normal vector does not deviate from the downward direction or the normal vector does not deviate from the downward direction for more than the second time period.

The present application further provides a recording medium (for example, a CD, a DVD, a floppy disk, a memory card, a hard disk, or a removable hard disk, etc), and the recording medium records a computer-readable permission approval program for executing foregoing controlling method. Herein the permission approval program recorded in the recording medium is usually composed of a plurality of code snippets (for example, a code snippet for establishing an organization chart, a code snippet for approving a form, a configuration code snippet, and a deployment code snippet), and the functions of these code snippets are corresponding to the steps of the controlling method.

In summary, in the present application, according to the angle in which the handheld communication device is placed, the controlling method for the handheld communication device determines whether the handheld communication device should perform a function. When the front plane of the handheld communication device is placed from a upward direction to a downward direction, it is determined that the user does not want to pick up the phone or does not want to use the phone temporarily, so that the device is controlled to perform a function such as entering a mute mode to prevent from bothering, or entering a power saving mode to reduce unnecessary power waste. Thereby, a more intuitive and convenient way to control the handheld communication device is provided.

Although the present application has been described with reference to the above embodiments, it will be apparent to one of the ordinary skill in the art that modifications to the described embodiment may be made without departing from the spirit of the application. Accordingly, the scope of the application will be defined by the attached claims not by the above detailed description.

What is claimed is:

1. A method for controlling a handheld electronic device to perform a function by using a sensor to detect a tilting state of the handheld electronic device, comprising:
   detecting the tilting state of the handheld communication device by using the sensor;
   determining whether the tilting state of the handheld electronic device is changed from a face up state to a face down state, wherein the face up state corresponds to a first range and the face down state corresponds to a second range; and
   controlling the handheld electronic device to perform the function only when the handheld electronic device is determined to change from the face up state to the face down state.

2. The method of claim 1, wherein controlling the handheld electronic device to perform the function comprises controlling the handheld electronic device to enter a mute mode.

3. The method of claim 2, wherein the mute mode comprises muting a sound of the handheld electronic device.

4. The method of claim 2, wherein the mute mode comprises muting a ringtone notice.

5. The method of claim 1, wherein the sensor comprises a G-sensor.

6. The method of claim 5, wherein the first range of the face up state is 10 degrees such that the handheld electronic device is determined by the G-sensor to be in the face up state when the handheld electronic device is face up directly toward the positive normal Cartesian Z axis within the first range.

7. The method of claim 5, wherein:
   the tilting state of the handheld electronic device is determined to be in the face down state when the handheld electronic device is determined by the G-sensor to be face down directly toward a negative Cartesian Z axis within the second range which is 10 degrees.

8. The method of claim 1, further comprising:
   activating a sound notice; and
   in response to detecting that the tilting state of the handheld electronic device is changed from the face up state to the face down state while the sound notice is still being activated, controlling the handheld electronic device to enter a mute mode to mute the sound notice.

9. The method of claim 1, further comprising:
   activating a ringtone notice; and
   in response to detecting that the tilting state of the handheld electronic device is changed from the face up state to the face down state while the ringtone is still being activated, controlling the handheld electronic device to enter a mute mode to mute the ringtone notice.

10. The method of claim 1, further comprising:
    activating the ringtone notice in response to an incoming call;
    in response to detecting that the tilting state of the handheld electronic device is changed from the face up state to the face down state, controlling the handheld electronic device to enter a mute mode to mute the ringtone notice; and
    controlling the handheld electronic device to enter a normal mode after the incoming call is terminated.

11. A handheld electronic device, comprising:
    a sensor;
    a tilting state determining module coupled to the sensor for detecting a tilting state of the handheld communication device by using the sensor; and
    a controller coupled to the sensor and the tilting state determining module and is configured for determining whether the tilting state of the handheld electronic device is changed from a face up state to a face down state, wherein the face up state corresponds to a first range and the face down state corresponds to a second range and controlling the handheld electronic device to perform a function only when the handheld electronic device is determined changed from the face up state to the face down state.

12. The handheld electronic device of claim 11, wherein the function comprises controlling the handheld electronic device to enter a mute mode.

13. The handheld electronic device of claim 12, wherein the function comprises controlling the handheld electronic device to enter a mute mode comprises muting a sound of the handheld electronic device.

14. The handheld electronic device of claim 12, wherein the mute mode comprises muting a ringtone notice.

15. The handheld electronic device of claim 11, wherein the sensor comprises a G-sensor.

16. The handheld electronic device of claim 15, wherein the tilting state of the handheld electronic device is determined to be in the face up state when the handheld electronic device is determined by the G-sensor to be face up directly toward a positive Cartesian Z axis within the first range which is 10 degrees.

17. The handheld electronic device of claim 15, wherein the tilting state of the handheld electronic device is determined to be in the face down state when the handheld electronic device is determined by the G-sensor to be face down directly toward a negative Cartesian Z axis within the second range which is 10 degrees.

18. The handheld electronic device of claim 11, wherein the controller is further configured for
    activating a sound notice; and
    controlling the handheld electronic device to enter a mute mode to mute the sound in response to detecting that the tilting state of the handheld electronic device is changed from the face up state to the face down state while the sound notice is still being activated.

19. The handheld electronic device of claim 11, wherein the controller is further configured for:

activating a ringtone notice; and controlling the handheld electronic device to enter a mute mode to mute the ringtone notice in response to detecting that the tilting state of the handheld electronic device is changed from face up state to the face down state while the ringtone is still being activated.

20. The handheld electronic device of claim 11, wherein the controller is further configured for:

activating the ringtone notice in response to an incoming call;

controlling the handheld electronic device to enter a mute mode to mute the ringtone notice in response to detecting that the tilting state of the handheld electronic device is changed from the face up state to the face down state; and controlling the handheld electronic device to enter a normal mode after the incoming call is terminated.

21. A non-transitory computer-readable storage medium containing instructions loaded into an electronic device to perform a function by using a sensor to detect a tilting state of the handheld electronic device comprising:

detecting the tilting state of the handheld communication device by using the sensor;

determining whether the tilting state of the handheld electronic device is changed from a face up state to a face down state, wherein the face up state corresponds to a first range and the face down state corresponds to a second range; and controlling the handheld electronic device to perform the function only when the handheld electronic device is determined to change from the face up state to the face down state.

* * * * *